(12) United States Patent
Heimerdinger

(10) Patent No.: US 12,513,789 B2
(45) Date of Patent: Dec. 30, 2025

(54) SOUS VIDE ASSEMBLY FOR USE IN A MICROWAVE OVEN

(71) Applicant: Haier US Appliance Solutions, Inc., Wilmington, DE (US)

(72) Inventor: Mark Heimerdinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 940 days.

(21) Appl. No.: 17/579,676

(22) Filed: Jan. 20, 2022

(65) Prior Publication Data
US 2023/0232507 A1 Jul. 20, 2023

(51) Int. Cl.
| | |
|---|---|
| *H05B 6/64* | (2006.01) |
| *A47J 27/10* | (2006.01) |
| *A47J 36/02* | (2006.01) |
| *A47J 36/04* | (2006.01) |
| *A47J 36/32* | (2006.01) |

(Continued)

(52) U.S. Cl.
CPC ............ *H05B 6/6408* (2013.01); *A47J 27/10* (2013.01); *A47J 36/027* (2013.01); *A47J 36/04* (2013.01); *A47J 36/32* (2013.01); *H05B 6/6455* (2013.01); *A47J 2202/00* (2013.01); *A47J 2203/00* (2013.01); *H05B 6/681* (2013.01)

(58) Field of Classification Search
CPC .... A47J 2202/00; A47J 2203/00; A47J 27/10; A47J 36/027; A47J 36/04; A47J 36/32; H05B 6/6408; H05B 6/6455; H05B 6/681
USPC ....... 219/731, 712, 729, 732, 734, 687, 745, 219/730; 426/241, 243, 107, 412, 415, 426/232; 99/DIG. 14
See application file for complete search history.

(56) References Cited

U.S. PATENT DOCUMENTS

| | | | |
|---|---|---|---|
| 9,220,362 B2 | 12/2015 | Eades et al. | |
| 10,085,584 B2 * | 10/2018 | Johncock | ............... A47J 36/321 |
| 10,721,948 B1 | 7/2020 | Swayne | |

(Continued)

FOREIGN PATENT DOCUMENTS

| | | |
|---|---|---|
| CA | 2865211 A1 | 3/2016 |
| CN | 1779362 A | 5/2006 |

(Continued)

OTHER PUBLICATIONS

Everie Versatile 12-Quart Sous Vide Container with Built-in Rack and Collapsible Silicone Lid and Container Sleeve Compatible with All Sous Vide Cookers, KIT-1202-TYGJ, accessed https://www.amazon.ca/EVERIE-Versatile-Collapsible-Compatible-KIT-1202-TYGJ/dp/B0BKFN9PSH?th=1 on Mar. 19, 2024, 7 pages.

*Primary Examiner* — Quang T Van

(74) *Attorney, Agent, or Firm* — Dority & Manning, P.A.

(57) ABSTRACT

A sous vide assembly for use in a microwave oven includes an outer tank and an inner tank positioned inside the outer tank to define a heating gap therebetween. The inner tank and the outer tank are filled with water and are in fluid communication with each other through one or more apertures. One or more vertical dividers are positioned within the inner tank and extend along the vertical direction to define a plurality of food chambers and a cover is mounted over the one or more vertical dividers and is movable between an open position and a closed position to provide selective access to the plurality of food chambers and keep food submerged during the sous vide cooking process.

18 Claims, 4 Drawing Sheets

(51) Int. Cl.
*H05B 6/80* (2006.01)
*H05B 6/68* (2006.01)

(56) References Cited

U.S. PATENT DOCUMENTS

| | | | |
|---|---|---|---|
| 10,827,872 | B2 | 11/2020 | Trice |
| 10,863,589 | B2 | 12/2020 | Lee |
| 11,022,321 | B1 * | 6/2021 | Bhogal .................... G01K 1/08 |
| 11,659,634 | B2 * | 5/2023 | Staun .................... H05B 6/645 |
| | | | 219/679 |
| 2018/0049579 | A1 | 2/2018 | Puchinger et al. |
| 2019/0110630 | A1 | 4/2019 | Kitabayashi |
| 2020/0281049 | A1 | 9/2020 | Staun |
| 2020/0367692 | A1 | 11/2020 | Stipe |
| 2020/0397177 | A1 | 12/2020 | Walsh |
| 2021/0038013 | A1 | 2/2021 | Trice et al. |
| 2022/0257043 | A1 | 8/2022 | Baldwin et al. |
| 2023/0232507 | A1 | 7/2023 | Heimerdinger |
| 2023/0247736 | A1 | 8/2023 | Staun et al. |

FOREIGN PATENT DOCUMENTS

| | | |
|---|---|---|
| CN | 105823098 B | 2/2018 |
| JP | 2005077021 A | 3/2005 |
| KR | 101728660 B1 | 4/2017 |
| KR | 20230117985 A | 8/2023 |
| WO | WO2020173027 A1 | 9/2020 |
| WO | WO2020253812 A1 | 12/2020 |

\* cited by examiner

SOUS VIDE ASSEMBLY FOR USE IN A MICROWAVE OVEN

FIELD OF THE INVENTION

The present subject matter relates generally to microwave oven appliances, and more particularly to systems and methods for implementing sous vide cooking in microwave oven appliances.

BACKGROUND OF THE INVENTION

Microwave oven appliances generally include a cabinet that defines a cooking chamber for receipt of food items for cooking. These appliances typically include one or more heating elements for generating energy to heat the food items during a cooking process. For example, microwave ovens typically include at least one source of electromagnetic radiation in the microwave frequency range, such as a cavity magnetron. In order to provide selective access to the cooking chamber and to contain food particles and cooking energy (e.g., microwaves) during a cooking operation, microwave appliances further include a door that is typically pivotally mounted to the cabinet.

Sous vide is a method of cooking that requires the application of low levels of heat (e.g., 130 to 160 degrees Fahrenheit) over the course of several hours (e.g., one or more hours, such as two or more hours, such as three or more hours, etc.). Even small temperature variations over the duration of the cooking operation can result in drastically different cooking outcomes. In sous vide, food is often cooked by sealing the food a liquid-proof bag and submerging the bag in liquid that is maintained at the desired temperature. However, conventional sous vide assemblies for use in a microwave permit direct exposure of the food to microwave energy, which may quickly result in overcooking or uneven heating.

Accordingly, a microwave oven and sous vide assembly that facilitates improved sous vide cooking would be desirable. More specifically, a sous vide assembly that may be used in a microwave to facilitate a sous vide cooking process while preventing the exposure of food to undesirable levels of microwave energy would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a microwave oven is provided defining a vertical, a lateral, and a transverse direction. The microwave oven includes a cabinet defining a cooking chamber, a door rotatably mounted to the cabinet for providing selective access to the cooking chamber, and a sous vide assembly configured for receipt within the cooking chamber. The sous vide assembly includes an outer tank configured for containing a volume of liquid, an inner tank positioned inside the outer tank such that a heating gap is defined between the inner tank and the outer tank, one or more vertical dividers positioned within the inner tank and extending along the vertical direction to define a plurality of food chambers, and a cover mounted over the one or more vertical dividers and being movable between an open position and a closed position to provide selective access to the plurality of food chambers.

In another exemplary embodiment, a sous vide assembly for use in a microwave oven is provided. The microwave oven includes a cabinet defining a cooking chamber. The sous vide assembly includes an outer tank configured for containing a volume of liquid, an inner tank positioned inside the outer tank such that a heating gap is defined between the inner tank and the outer tank, one or more vertical dividers positioned within the inner tank and extending along a vertical direction to define a plurality of food chambers, and a cover mounted over the one or more vertical dividers and being movable between an open position and a closed position to provide selective access to the plurality of food chambers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
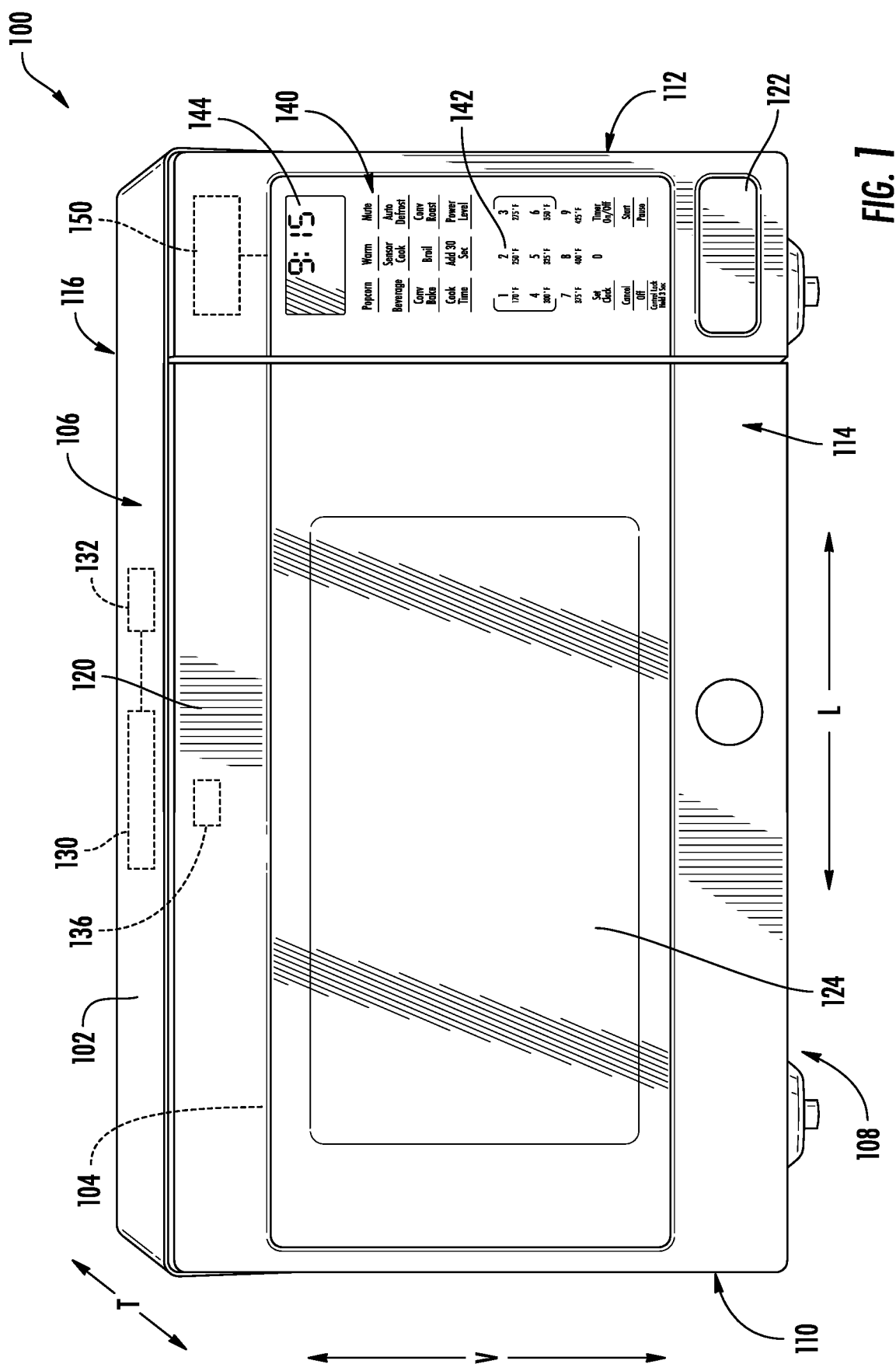
FIG. 1 provides a perspective front view of a microwave oven appliance in accordance with an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
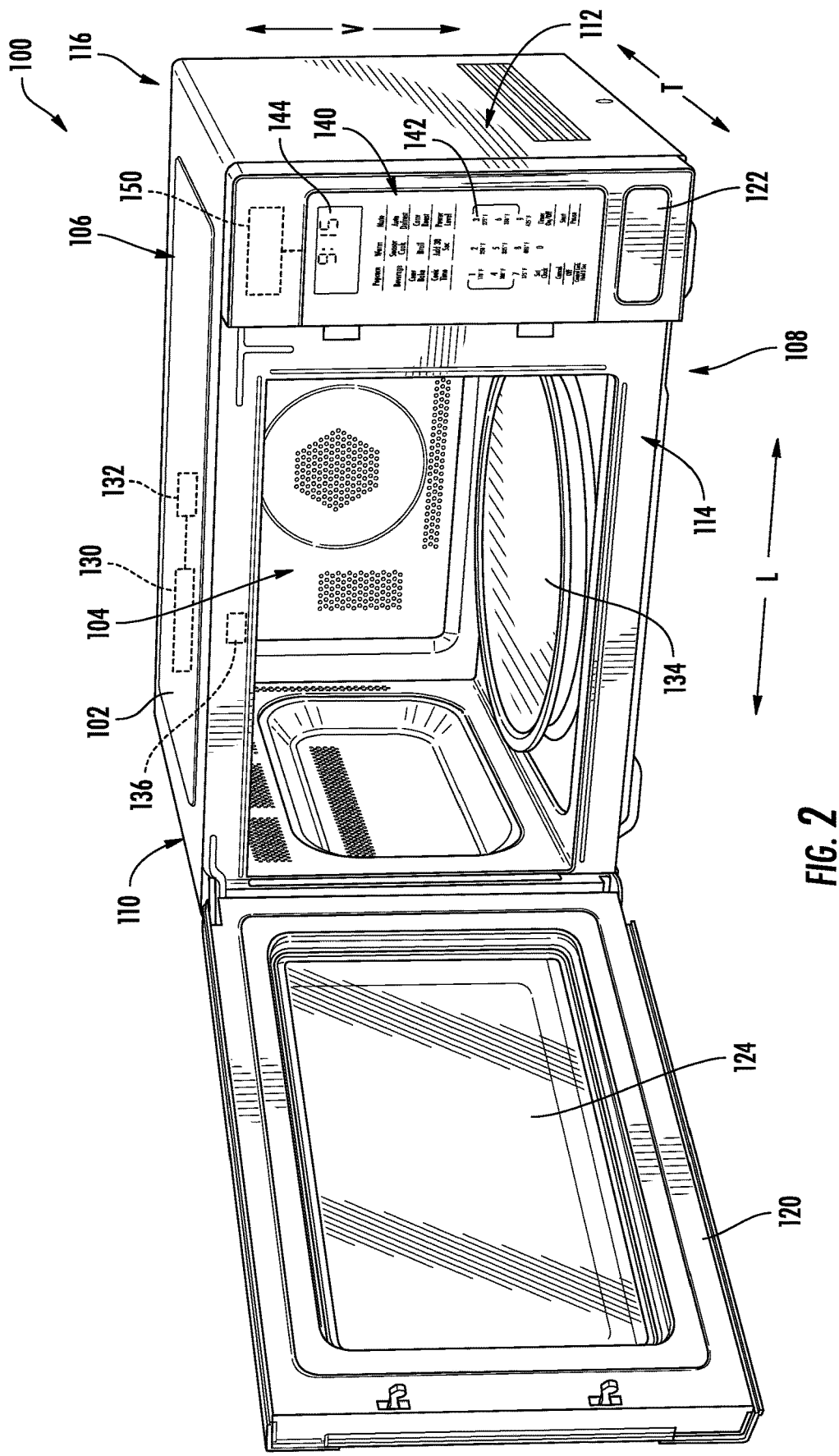
FIG. 2 provides a perspective view of the exemplary microwave oven of FIG. 1 with the door in an open position according to exemplary embodiments of the present disclosure.

Referring now to the figures, FIG. 1 provides a front view of a microwave oven 100 as may be employed with the present subject matter and FIG. 2 provides a perspective view of microwave oven 100 with the door in the open position. Microwave oven 100 includes an insulated cabinet 102 that defines a cooking chamber 104 for receipt of food items for cooking. As will be understood by those skilled in the art, microwave oven 100 is provided by way of example only, and the present subject matter may be used in any suitable microwave oven, such as a countertop microwave oven, an over-the-range microwave oven, etc. Thus, the example embodiment shown in the figures is not intended to limit the present subject matter to any particular cooking chamber configuration or arrangement.

As illustrated, microwave oven 100 generally defines a vertical direction V, a lateral direction L, and a transverse direction T, each of which is mutually perpendicular, such that an orthogonal coordinate system is generally defined. Cabinet 102 of microwave oven 100 extends between a top 106 and a bottom 108 along the vertical direction V, between a first side 110 (left side when viewed from front) and a second side 112 (right side when viewed from front) along the lateral direction L, and between a front 114 and a rear 116 along the transverse direction T.

Microwave oven 100 includes a door 120 that is rotatably attached to cabinet 102 in order to permit selective access to cooking chamber 104. A handle may be mounted to door 120 to assist a user with opening and closing door 120 in order to access cooking chamber 104. As an example, a user can pull on the handle mounted to door 120 to open or close door 120 and access cooking chamber 104. Alternatively, microwave oven 100 may include a door release button 122 that disengages or otherwise pushes open door 120 when depressed. Glass windowpanes 124 provide for viewing the contents of cooking chamber 104 when door 120 is closed and also assist with insulating cooking chamber 104.

Microwave oven 100 is generally configured to heat articles, e.g., food or beverages, within cooking chamber 104 using electromagnetic radiation. Microwave appliance 100 may include various components which operate to produce the electromagnetic radiation, as is generally understood. For example, microwave appliance 100 may include a microwave heating assembly 130 which may include a magnetron (such as, for example, a cavity magnetron), a high voltage transformer, a high voltage capacitor and a high voltage diode.

According to exemplary embodiments, microwave oven 100 may further include an inverter power supply 132 that is operably coupled to microwave heating assembly 130 to provide energy from a suitable energy source (such as an electrical outlet) to microwave heating assembly 130, e.g., the magnetron. The magnetron may convert the energy to electromagnetic radiation, specifically microwave radiation. Microwave heating assembly 130 and/or inverter power supply 132 may include other suitable components, such as a capacitor that generally connects the magnetron and power supply, such as via high voltage diode, to a chassis. Microwave radiation produced by the magnetron may also be transmitted through a waveguide to cooking chamber 104.

As would be appreciated by one having ordinary skill in the art, inverter power supply 132 allows the magnetron's analog electric field intensity to be adjusted between various power levels, such as between 10% and 100% of the total power capacity. By contrast, with conventional non-inverter power supplies, the electric field intensity is either 100% or 0%, and power levels are made using a timed duty cycle. For example, a non-inverter power supply set for a 50% power level would turn the magnetron ON at 100% output power for 15 seconds, and then OFF for 15 seconds. At power levels less than 100%, inverter power supply 132 has much better heating uniformity and less penetration depth—ideal heating for sous vide as the inverter power supply heats the water while avoiding direct heating of the food with microwave energy.

The structure and intended function of microwave ovens are generally understood by those of ordinary skill in the art and are not described in further detail herein. According to alternative embodiments, microwave oven may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

Microwave oven 100 may include additional features to improve heating uniformity and precision. For example, according to an exemplary embodiment, microwave oven 100 includes a turntable 134 rotatably mounted within cooking chamber 104. Turntable 134 may be selectively rotated during a cooking process to ensure improved temperature uniformity for the object being heated. In addition, microwave oven 100 may include an infrared temperature sensing array 136 that can measure temperatures across the entire bottom of the cooking chamber 104. Temperature sensing array 136 may detect temperatures at various distinct temperature locations, may associate certain locations with the food items being cooked, and may use a subset of the temperature data as feedback for regulating inverter power supply 128 and microwave heating assembly 126 for improved precision.

Referring again to FIG. 1, a user interface panel 140 and a user input device 142 may be positioned on an exterior of the cabinet 102. The user interface panel 140 may represent a general purpose Input/Output ("GPIO") device or functional block. In some embodiments, the user interface panel 140 may include or be in operative communication with user input device 142, such as one or more of a variety of digital, analog, electrical, mechanical or electro-mechanical input devices including rotary dials, control knobs, push buttons, and touch pads. The user input device 142 is generally positioned proximate to the user interface panel 140, and in some embodiments, the user input device 142 may be positioned on the user interface panel 140. The user interface panel 140 may include a display component 144, such as a digital or analog display device designed to provide operational feedback to a user.

Generally, microwave oven 100 may include a controller 150 in operative communication with the user input device 142. The user interface panel 140 of the microwave oven 100 may be in communication with the controller 150 via, for example, one or more signal lines or shared communication busses, and signals generated in controller 150 operate microwave oven 100 in response to user input via the user input devices 142. Input/Output ("I/O") signals may be routed between controller 150 and various operational components of microwave oven 100. Operation of microwave oven 100 can be regulated by the controller 150 that is operatively coupled to the user interface panel 140.

Controller 150 is a "processing device" or "controller" and may be embodied as described herein. Controller 150 may include a memory and one or more microprocessors, microcontrollers, application-specific integrated circuits (ASICS), CPUs or the like, such as general or special purpose microprocessors operable to execute programming instructions or micro-control code associated with operation of microwave oven 100, and controller 150 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Aspects of the present subject matter are generally directed to systems and methods for implementing a sous vide cooking process in a microwave oven, such as microwave oven 100. More particularly, according to exemplary embodiments of the present subject matter, cooking chamber 104 is configured for receipt of a sous vide assembly 200 (e.g., on turntable 134) for facilitating a sous vide cooking process within microwave oven 100. According to exemplary embodiments, turntable 134 is rotated during the sous vide process for improved thermal uniformity. As would be appreciated by one having ordinary skill in the art, a sous vide cooking process is a type of cooking where a food item (such as meat) is vacuum sealed in a bag and submerged in a bath of water maintained at a desired temperature until the meat reaches the desired internal temperature. Notably, precise temperature control is very desirable for sous vide cooking processes.

Figure 3:
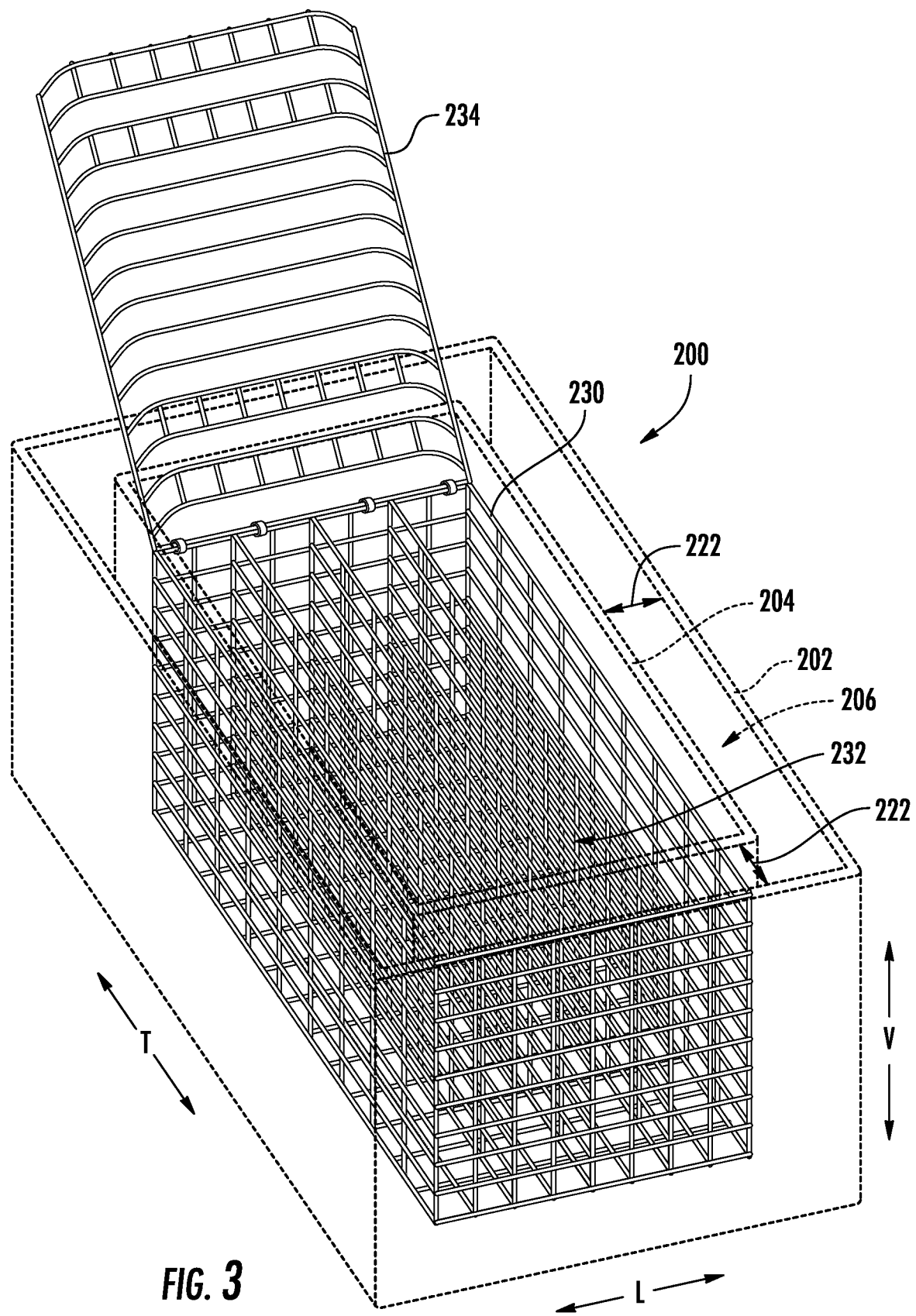
FIG. 3 provides a perspective view of a sous vide assembly that may be used in the exemplary microwave oven of FIG. 1 according to an exemplary embodiment of the present subject matter.
Figure 4:
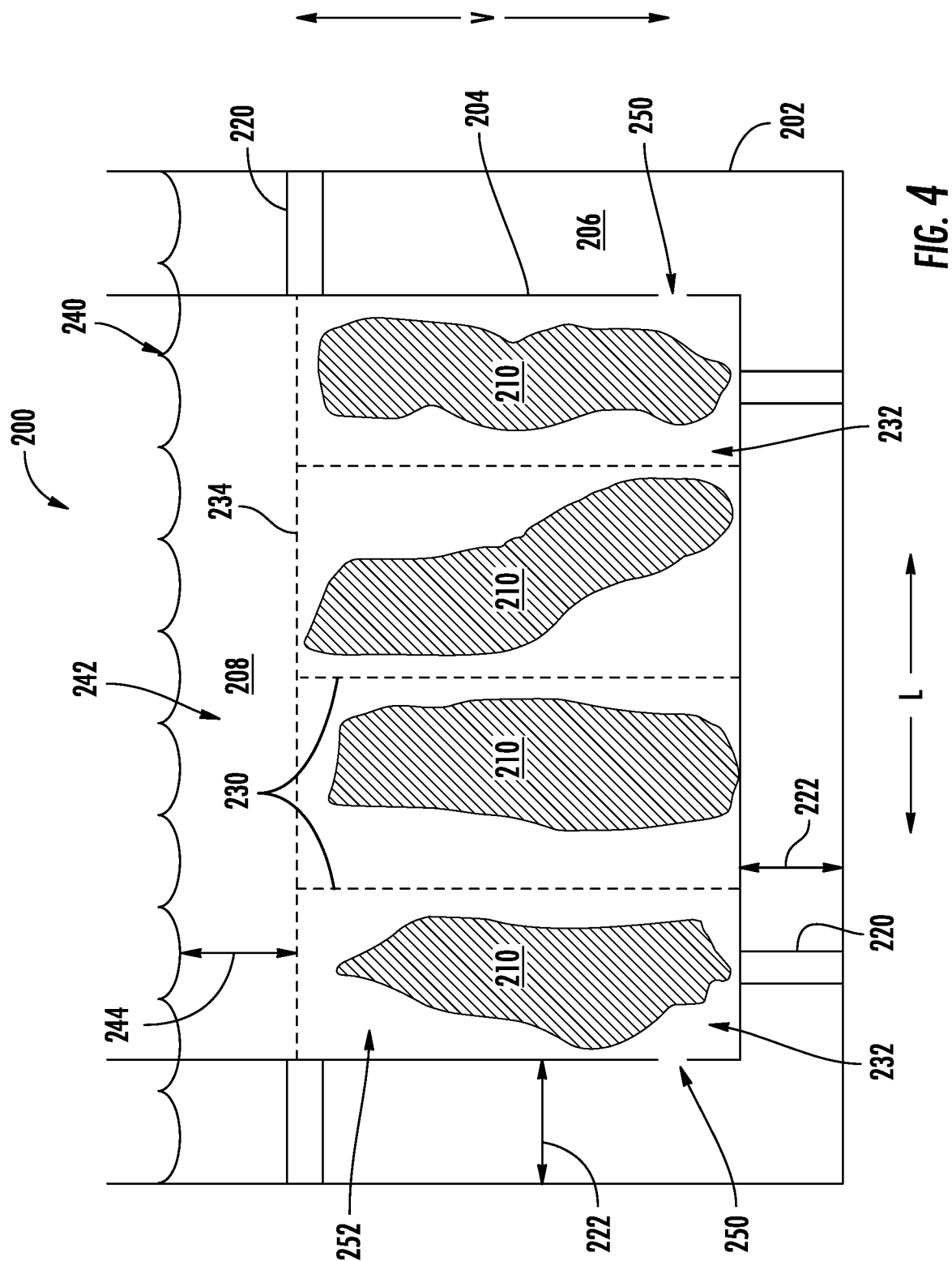
FIG. 4 provides a side, schematic view of the exemplary sous vide assembly of FIG. 3 according to an exemplary embodiment of the present subject matter.

Referring now specifically to FIGS. 3 and 4, sous vide assembly 200 will be described in detail according to an exemplary embodiment of the present subject matter. As mentioned above, sous vide assembly 200 is generally configured for receipt within cooking chamber 104 microwave oven 100 to facilitate a sous vide cooking process. However, it should be appreciated that the present subject matter is not limited to the specific construction of sous vide assembly 200 or to the particular application described, e.g., use within microwave oven 100.

Referring now to the figures, sous vide assembly 200 generally includes an outer tank 202 and an inner tank 204 positioned inside outer tank 202 such that a heating gap 206 is defined between inner tank 204 and outer tank 202. In general, outer tank 202 may be a watertight, open-top container having a bottom wall and a plurality of sidewalls that are joined and configured for containing a volume of liquid (e.g., illustrated herein as a water 208). As will be explained in more detail below, microwave heating assembly 130 is generally configured for heating water 208 to facilitate a sous vide cooking process and cook a food item (e.g., identified herein generally by reference numeral 210) positioned within inner tank 204.

According to the illustrated embodiment, outer tank 202 and inner tank 204 are joined together such that heating gap 206 is maintained throughout the sous vide cooking process. For example, according to the illustrated embodiment, sous vide assembly 200 may include a plurality of tank spacers 220 that are positioned between inner tank 204 and outer tank 202 to maintain heating gap 206. According to the illustrated embodiment, heating gap 206 is substantially constant around the sides and along the bottom of inner tank 204. However, it should be appreciated that heating gap 206 may vary according to alternative embodiments while remaining within the scope present subject matter. In this regard, for example, heating gap 206 may be larger where microwave energy is more intense, and vice versa.

In addition, tank spacers 220 and/or heating gap 206 may have any suitable size or dimension. For example, sous vide assembly 200 is generally sized and configured such that microwave energy penetrates the water 208 that is within heating gap 206 while the water 208 and food items 210 within inner tank 204 are not exposed to direct microwave energy. In this regard, as the microwave energy penetrates water 208, the electric field intensity decreases exponentially. When heating gap 206 is appropriately sized, substantially all of the microwave energy is absorbed within heating gap 206 (e.g., such that there is negligible cooking effect of the microwave energy on the food items 210). Accordingly, heating gap 206 may generally define a gap length 222 that is measured between outer tank 202 and inner tank 204. In this regard, gap length 222 may be measured perpendicular to outer tank 202 or as the shortest distance between a given point on outer tank 202 and the closest point on inner tank 204.

According to exemplary embodiments, gap length 222 may be between about 5 millimeters and 40 millimeters, between about 10 millimeters and 30 millimeters, or about 20 millimeters. It should be appreciated that gap length 222 may vary while remaining within the scope of the present subject matter. For example, the desirable gap length may vary based on the proximity of food items 210 to the outer tank, to the intensity of microwave energy, or based on any other suitable factors.

Notably, because microwave energy is intended only to penetrate into heating gap 206, the water 208 within the inner tank 204 is heated by heat transfer from water 208 within heating gap 206 into inner tank 204. Accordingly, inner tank 204 may be maintained at the desirable temperature by controlling the microwave energy that is imparted into heating gap 206 without exposing the water 208 within inner tank 204 to direct microwave energy. This provides for a more controlled sous vide cooking process within inner tank 204.

To avoid exposure of food items to direct microwave energy, food items 210 are intended to be contained entirely within inner tank 204. More specifically, according to the illustrated embodiment, sous vide assembly 200 further includes one or more vertical dividers 230 that are positioned within inner tank 204 and that extend substantially along the vertical direction V to define a plurality of food chambers 232. For example, according to the illustrated embodiment, sous vide assembly 200 includes three vertical dividers 230 that define four food chambers 232. As illustrated, a food item 210 (e.g., such as a steak) may be positioned within each of the food chamber 232 during the sous vide cooking process.

In general, vertical dividers 230 are illustrated herein as dividing inner tank 204 into four identically-sized compartments. However, it should be appreciated that according to alternative embodiments, any suitable number, size, configuration, and orientation of vertical dividers 230 may be used to form any suitable chamber configuration within inner tank 204. In general, food chambers 232 are sized such that one or more food items 210 may be positioned within each respective chamber 232 while providing sufficient space for water 208 to surround food items 210 and circulate within inner tank 204 for improved temperature uniformity throughout inner tank 204 and even cooking.

In addition, it may be desirable to ensure that food items 210 positioned within inner tank 204 remain submerged within water 208, e.g., to prevent direct exposure of food items 210 to microwave energy. Accordingly, sous vide assembly 200 may further include a cover 234 that is pivotally mounted over the one or more vertical dividers 230 and is movable between an open position and a closed position to provide selective access to the plurality of food chambers 232. For example, according to the exemplary illustrated embodiment, cover 234 is pivotally mounted to the ends of vertical dividers 230 and is movable to a closed position (e.g., as shown in FIG. 4) to define the top end of food chambers 232.

For reasons similar to those described above with respect heating gap 206 it is desirable that a top surface of water 208 is far enough above a top of food chambers 232 such that microwave energy does not directly enter food chambers 232 and cook food items 210. Accordingly, outer tank 202 may generally define a target fill line (e.g., identified generally by reference numeral 240) to which water 208 is filled prior to performing a sous vide cooking process. In addition, an upper heating gap 242 may generally be defined along the vertical direction V between a target fill line 240 and cover 234 when cover 234 is in the closed position. According to exemplary embodiments, upper heating gap 242 may define an upper gap length 244 that is substantially equivalent to or greater than gap length 222. In this manner, all six sides surrounding inner tank 204 and food chambers 232 may have sufficient depth to prevent microwave energy from being directly exposed to food items 210 being cooked during the sous vide process. In this regard, it may be desirable to ensure that cover 234 is fully submerged by the upper heating gap 242, e.g., to ensure that the temperature sensors only measure the temperature of water 208.

As best shown in FIG. 4, sous vide assembly 200 may further include one or more apertures 250 to provide fluid communication between outer tank 202 and inner tank 204. More specifically, inner tank 204 generally defines an internal reservoir 252 (e.g., including food chambers 232 and upper heating gap 242). The one or more apertures 250 provide fluid communication between internal reservoir 252 and heating gap 206. In general, apertures 250 are only intended to ensure that the water levels within outer tank 202 and inner tank 204 remain at the same level (e.g., the target fill line 240). Apertures 250 are generally small enough to maintain such similar water levels without significant water exchange between heating gap 206 and internal reservoir 252. In other words, the sidewalls of inner tank 204 may be solid (with the exception of apertures 250) such that heating gap 206 and internal reservoir 252 are substantially in fluid isolation from each other. Accordingly, nearly all of the heat that is provided into food chambers 232 is provided via conduction through the walls of inner tank 204. In general, this construction improves the water temperature variation within inner tank 204 such that the water temperature may be maintained with precision.

According to exemplary embodiments, vertical dividers 230 and cover 234 may be formed from any suitable materials and have any suitable construction that permits water 208 to flow freely around and within food chambers 232. For example, according to exemplary embodiments, vertical dividers 230 and cover 234 are formed from perforated plates, mesh sheets, lattice structures, interwoven wires, or any other suitable material and construction. In this manner, water 208 within inner tank 204 may circulate freely between and among food chambers 232 such that there are minimal temperature gradients throughout food chambers 232 and inner tank 204.

According to exemplary embodiments, inner tank 204, outer tank 202, vertical dividers 230, and cover 234 may be formed in any suitable manner and using any suitable material. For example, all of these components may be injection molded with a food-grade polymer material. Accordingly, it should be appreciated that various features of sous vide assembly 200 may be formed from any suitably rigid material. For example, according to exemplary embodiments, inner tank 204, outer tank 202, vertical dividers 230, and cover 234 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of sous vide assembly 200 may be formed from any other suitable rigid material.

As explained herein, aspects of the present subject matter are generally directed to a sous vide cooking fixture assembly for a microwave oven that may include an inverter power supply and an infrared sensing array. The sous vide fixture may include two tanks—an outer and an inner tank—with food dividers and a lid to prevent food from floating up to the surface of the water. The outer tank may be filled with water, absorbs microwave energy on all six sides, and conducts heat to the inner tank. The inner tank may only absorb energy on top surface of water, thereby improving water temperature variation so that steaks or other food items can be cooked uniformly. The inverter power supply may be used to attain better heating uniformity than non-inverter power supply. The sensing array may sense the surface temperature of water at three stages—i.e., initial, pre-heat, and final stage—to further control the inverter power level. According to exemplary embodiments, the sous vide fixture assembly is made of injection molded components.

In addition, or alternatively, aspects of the present subject matter are directed to a microwave oven utilizing a sous vide cooking technique. Generally, conventional counter-top sous vide cooking appliances use a separate immersion pump dipped into a sous vide reservoir that stirs and maintains water in the sous vide reservoir at a uniform temperature throughout the cooking process. Also, in a conventional microwave oven cooking process, heat/temperature may not thoroughly cook into a food, as the water in the food does not heat from direct microwave energy absorption. In order to overcome the aforementioned problems, aspects of the present subject matter integrate the microwave oven with the sous vide cooking technique and thereby eliminates the usage of separate counter-top sous vide appliances.

According to exemplary embodiments, a consumer selects the quantity of servings, the type of food, and the desired doneness from a selection menu. Then, the consumer may place the food in a vacuum-sealed bag or container and into the sous vide reservoir. The consumer may also use hot water in the sous vide reservoir to save time in heating water and may be prompted if the water is too hot from a tap for the food doneness selection, so that the consumer may then refill with cooler water.

According to exemplary embodiments, the microwave oven may further include power control software for measuring the surface temperature of the water by means of an infrared sensor. For example, the infrared sensor may be placed at an upper surface of a microwave cavity. The infrared temperature measurement may provide feedback to the power control software, which may thereby regulate the surface temperature of the water at a sous vide set-point and prevent the food from overcooking. As the water absorbs the microwave energy, the power control software may regulate the temperature and reduce power until thermal equilibrium occurs. In this way, thermal gradient can be controlled that enables the sous vide cooking in the microwave oven without mechanical stirring.

For example, when a magnetron in the microwave oven is on, microwave field patterns randomize the patterns continuously across the surface of the water. This randomized energy absorption, combined with warm water convectively rising, causes variation across the surface of the water. By turning the magnetron off, and waiting a short time period, the temperature variation across the surface decreases, enabling a more accurate temperature measurement. Thereafter, the power control software may optimize the power level to the minimum, and the sous vide reservoir may be maintained at a uniform temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A microwave oven defining a vertical, a lateral, and a transverse direction, the microwave oven comprising:
    a cabinet defining a cooking chamber;
    a door rotatably mounted to the cabinet for providing selective access to the cooking chamber; and
    a sous vide assembly configured for receipt within the cooking chamber, the sous vide assembly comprising:
        an outer tank configured for containing a volume of liquid, wherein the outer tank defines a target fill line;
        an inner tank positioned inside the outer tank such that a heating gap is defined between the inner tank and the outer tank;
        one or more vertical dividers positioned within the inner tank and extending along the vertical direction to define a plurality of food chambers; and
        a cover mounted over the one or more vertical dividers and being movable between an open position and a closed position to provide selective access to the plurality of food chambers, and wherein an upper heating gap is defined along the vertical direction between the target fill line and the cover in the closed position.

2. The microwave oven of claim 1, wherein the outer tank comprises a bottom wall and a plurality of sidewalls that are joined to form a water-tight reservoir.

3. The microwave oven of claim 1, wherein the inner tank defines an internal reservoir and at least one aperture to provide fluid communication between the internal reservoir and the heating gap defined between the inner tank and the outer tank.

4. The microwave oven of claim 3, wherein the inner tank comprises a bottom wall and a plurality of sidewalls that are solid and define the internal reservoir, and wherein the heating gap and the internal reservoir are in fluid isolation except through the at least one aperture.

5. The microwave oven of claim 1, wherein the heating gap defines a gap length, the gap length being between about 10 millimeters and 30 millimeters.

6. The microwave oven of claim 5, wherein the gap length is about 20 millimeters.

7. The microwave oven of claim 1, wherein the upper heating gap defines an upper gap length, the upper gap length being greater than or equal to a gap length of the heating gap.

8. The microwave oven of claim 1, wherein the one or more vertical dividers define a plurality of perforations to provide fluid communication among the plurality of food chambers.

9. The microwave oven of claim 1, wherein the sous vide assembly comprises:
    a plurality of tank spacers positioned between the inner tank and the outer tank to maintain the heating gap.

10. The microwave oven of claim 1, further comprising: a turntable rotatably mounted within the cooking chamber, the turntable being configured for receiving the sous vide assembly.

11. The microwave oven of claim 1, further comprising: a microwave heating assembly; and
an inverter power supply operably coupled to the microwave heating assembly to generate microwave energy within the cooking chamber.

12. The microwave oven of claim 1, further comprising: an infrared temperature sensor array for monitoring a temperature of a surface of liquid within the outer tank.

13. The microwave oven of claim 1, wherein the inner tank, the outer tank, the one or more vertical dividers, and the cover are injection molded with a food-grade polymer material.

14. A sous vide assembly for use in a microwave oven, the microwave oven comprising a cabinet defining a cooking chamber, the sous vide assembly comprising:
an outer tank configured for containing a volume of liquid, wherein the outer tank defines a target fill line;
an inner tank positioned inside the outer tank such that a heating gap is defined between the inner tank and the outer tank;
one or more vertical dividers positioned within the inner tank and extending along a vertical direction to define a plurality of food chambers; and
a cover mounted over the one or more vertical dividers and being movable between an open position and a closed position to provide selective access to the plurality of food chambers, and wherein an upper heating gap is defined along the vertical direction between the target fill line and the cover in the closed position.

15. The sous vide assembly of claim 14, wherein the outer tank comprises a bottom wall and a plurality of sidewalls that are joined to form a water-tight reservoir, and wherein the inner tank defines an internal reservoir and at least one aperture to provide fluid communication between the internal reservoir and the heating gap defined between the inner tank and the outer tank.

16. The sous vide assembly of claim 14, wherein the heating gap defines a gap length, the gap length being between about 20 millimeters.

17. The sous vide assembly of claim 14, wherein the one or more vertical dividers define a plurality of perforations to provide fluid communication among the plurality of food chambers.

18. The sous vide assembly of claim 14, wherein the sous vide assembly comprises:
a plurality of tank spacers positioned between the inner tank and the outer tank to maintain the heating gap.

* * * * *